US008552075B2

(12) United States Patent
Tsai et al.

(10) Patent No.: US 8,552,075 B2
(45) Date of Patent: Oct. 8, 2013

(54) LOW PERMEABILITY COMPOSITE PROTON EXCHANGE MEMBRANE INCLUDING ORGANIC-INORGANIC HYBRID

(75) Inventors: Li-Duan Tsai, Hsinchu (TW); Hung-Chung Chien, Chiayi County (TW); Yong-Hong Liao, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 45 days.

(21) Appl. No.: 13/103,106

(22) Filed: May 9, 2011

(65) Prior Publication Data

US 2012/0172461 A1    Jul. 5, 2012

(30) Foreign Application Priority Data

Dec. 30, 2010  (TW) .............................. 99146926 A

(51) Int. Cl.
*C08K 3/04* (2006.01)

(52) U.S. Cl.
USPC .............................. 521/27; 977/734; 429/492

(58) Field of Classification Search
USPC .............................. 521/27; 429/492; 977/734
See application file for complete search history.

(56) References Cited

U.S. PATENT DOCUMENTS

| 3,993,503 | A * | 11/1976 | Ludwig ........................ 429/103 |
| 7,029,559 | B2 | 4/2006 | Won et al. |
| 7,315,106 | B2 | 1/2008 | Asaka et al. |
| 7,578,990 | B2 | 8/2009 | Li et al. |
| 7,629,285 | B2 | 12/2009 | Popov et al. |
| 2006/0269816 | A1 | 11/2006 | Kim et al. |
| 2010/0028749 | A1 | 2/2010 | Dadheech et al. |
| 2012/0135333 | A1* | 5/2012 | Meredith et al. .............. 429/492 |
| 2012/0168383 | A1* | 7/2012 | Koo et al. ...................... 210/688 |
| 2012/0171093 | A1* | 7/2012 | Swager et al. ................ 423/219 |

FOREIGN PATENT DOCUMENTS

| CN | 1561525 | 1/2005 |
| CN | 101531765 | 9/2009 |

OTHER PUBLICATIONS

Kou et al., Enhanced activity and stability of Pt catalysts on functionalized graphene sheets for electrocatalytic oxygen reduction., Electrochemistry Communications Membranes May 2009, vol. 11, pp. 954-957.*

Kou et al, Enhanced activity and stability of Pt catalysts on functionalized graphene sheets for electrocatalytic oxygen reduction., Electrochemistry Communications Membranes May 2009, vol. 11, pp. 954-957.

Jiang et al., Porous Graphene as the Ultimate Membrane for Gas Separation, Nano Letters, 2009, vol. 9, No. 12, pp. 4019-4024.

(Continued)

*Primary Examiner* — Peter D. Mulcahy
*Assistant Examiner* — Henry Hu
(74) *Attorney, Agent, or Firm* — Jianq Chyun IP Office

(57) ABSTRACT

A composite proton exchange membrane is made up of dispersed organized graphene in ion conducting polymer as a fuel barrier material. The composite proton exchange membrane includes an inorganic material of 0.001-10 wt % and an organic material of 99.999-90 wt %. The inorganic material is a graphene derivative with two-dimensional structure. The organic material includes a polymer material with sulfonic acid group.

6 Claims, 1 Drawing Sheet

(56) References Cited

OTHER PUBLICATIONS

"Office Action of Taiwan Counterpart Application", issued on Jun. 26, 2013, p1-p4, in which the listed reference was cited.

Qi Ma, "A Study on Graphene Oxide Nanocomposite Membrane," Chinese Master's Theses Full-text database Engineering Science and Technology I, Aug. 31, 2009, vol. 8.

"Office Action of China Counterpart Application", issued on Jul. 22, 2013, p1-p6, in which the listed references were cited.

* cited by examiner

LOW PERMEABILITY COMPOSITE PROTON EXCHANGE MEMBRANE INCLUDING ORGANIC-INORGANIC HYBRID

CROSS-REFERENCE TO RELATED APPLICATION

This application claims the priority benefit of Taiwan application Ser. No. 99146926, filed Dec. 30, 2010. The entirety of the above-mentioned patent application is hereby incorporated by reference herein and made a part of this specification.

TECHNICAL FIELD

The disclosure relates to an organic/inorganic hybrid composite proton exchange membrane having low permeability.

BACKGROUND

Fuel cells (FCs) are electrochemical devices that convert chemical energy directly into electrical energy. The FCs have several properties over other energy sources, such as low pollution, low noise, high energy density, high energy conversion efficiency, and so on. Accordingly, the FCs are oncoming clean energy source, and have been applied in various fields including a portable electronic product, a home power generation system, transportation, military equipment, space industry and a small-size power generation system.

Specifically, various FCs can be applied to different fields based on operational principles and conditions. When the FC is used as a mobile energy source, the FC mainly refers to a hydrogen proton exchange membrane fuel cell (PEMFC) and a direct methanol fuel cell (DMFC). Both of them are operated at low temperature with use of the proton exchange membrane to perform proton conduction mechanism.

Taken the DMFC for example, oxidation reaction between methanol and water takes place in an anode catalyst layer, such that hydrogen ions ($H^+$), carbon dioxide ($CO_2$) and electrons ($e^-$) are generated. The hydrogen ions can be conducted to the cathode through a proton-conducting membrane, while the electrons can be transported to the cathode after the electrons flowing through an external circuit. Here, the oxygen supplied to the cathode may reduce with the hydrogen ions and the electrons at a cathode catalyst layer, and thereby water is produced. Accordingly, the performance of the PEMFC relies on the three-phase catalytic reaction efficiency, i.e. electron-conductivity, ion-conductivity, and fuel-activity that all matter to design of the FC. If any of the three conductive paths is hindered, the performance of the PEMFC is affected accordingly. Particularly, the ion-conductivity is mainly determined based on the proton exchange membrane.

It is noted that since methanol crossover occurs in the membrane electrode assembly (MEA) of the DMFC, the membrane electrode assembly has problems such as short lifetime, decreased power generation efficiency, and so on. In the conventional FCs, liquid, colloid, solid or gaseous organic fuels including alcohols such as methanol, aldehydes or acids are crossover in the anode structure. Therefore, a portion of the fuels and water do not react with the catalysts while passing the anode, and directly pass through the proton exchange membrane to the cathode. Accordingly, catalytic capacity of the cathode is reduced. In addition, the fuels are oxidized and the oxygen nearby is reduced in the cathode catalyst layer, thereby jointly forming a mixed potential. Accordingly, the output voltage of the FC is decreased, and the utility efficiency of the fuels is also reduced. Furthermore, crossover of the fuels results in swelling of the proton exchange membrane and the cathode adhesive agent, which accelerates the aging of the cathode structure.

Methanol crossover is the main factor which toxicifies the cathode catalyst and affects the durability of the cell. In addition, methanol crossover is also the main factor which causes the mixed potential to reduce the output efficiency. Accordingly, a proton exchange membrane which efficiently blocks methanol is needed. Particularly, when the proton exchange membrane has a low swelling property, peeling, caused by the swelling of the proton exchange membrane with the electrode adhesive agent, is significantly reduced.

SUMMARY

An organic/inorganic hybrid composite proton exchange membrane is introduced herein to reduce methanol crossover while maintain high proton conductivity.

In the disclosure, an organic/inorganic hybrid composite proton exchange membrane is provided, and the composite proton exchange membrane includes an inorganic material of 0.001-10 wt % and an organic material of 99.999-90 wt %. The inorganic material is a graphene derivative with two-dimensional structure. The organic material includes a polymer material with sulfonic acid group.

Based on the above, the graphene derivative with two-dimensional structure is mixed into the proton exchange membrane, and therefore the issue of methanol crossover is prevented by advantageous sheet structure of the graphene derivative.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
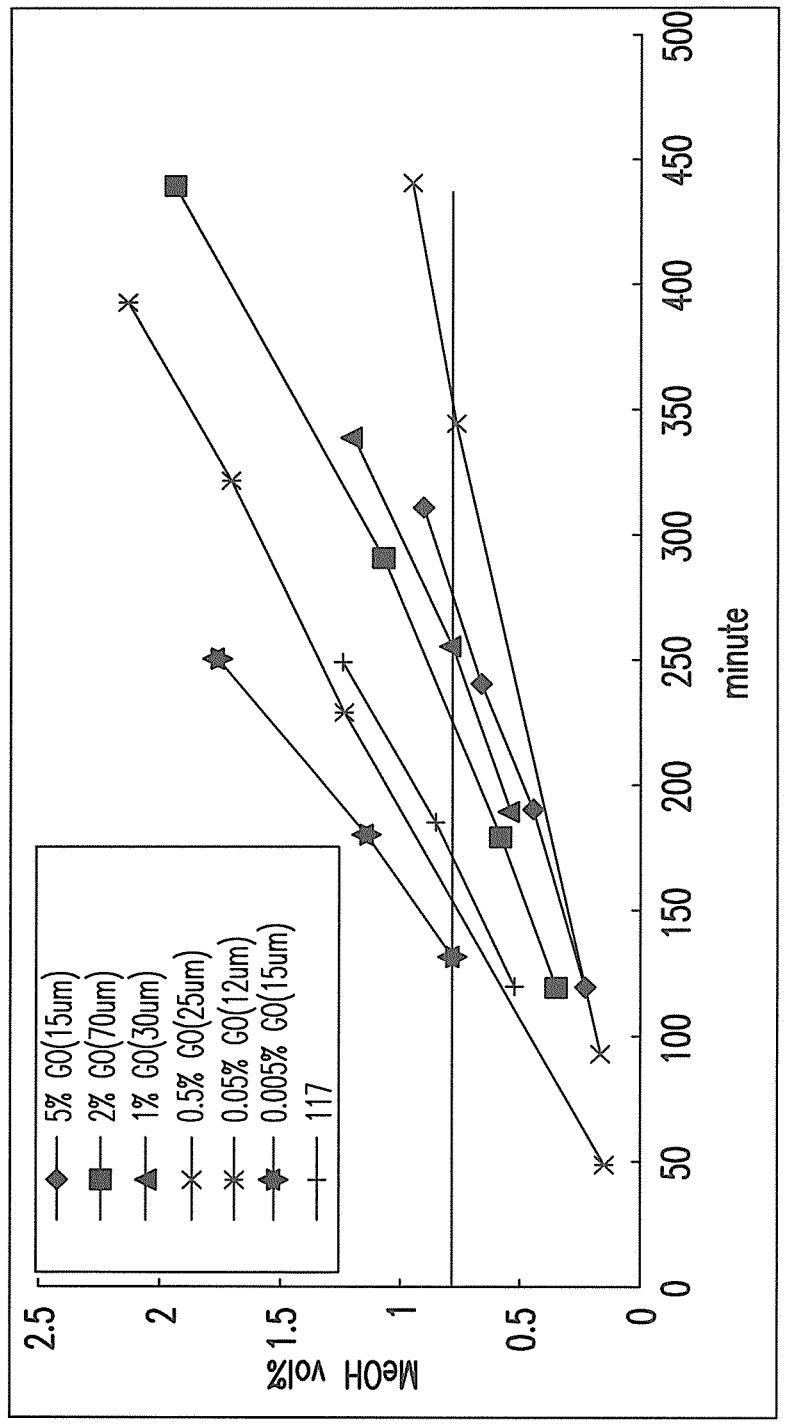
FIG. 1 is a diagram showing concentration vs. time of methanol permeated through a proton exchange membrane according to Example 4.

The exemplary embodiment provides a proton exchange membrane, which is an organic/inorganic hybrid composite proton exchange membrane formed by mixing an inorganic material and an organic material. The organic/inorganic hybrid composite proton exchange membrane includes a graphene derivative with two-dimensional structure as the inorganic material of about 0.001-10 wt % and a polymer material with sulfonic acid group as the organic material of about 99.999-90 wt %. Particularly, the graphene derivative is selected from a group consisting of graphene oxide, graphene sulfide, graphene hydroxide, graphene carbonate, graphene nitride and graphene sulfonate. For example, when the graphene derivative is graphene oxide, graphene sulfide or graphene sulfonate, the amount of the graphene derivative is 0.001-5 wt %.

The organic material is PTFE-PFSA copolymer or sulfonated hydrocarbon polymer such as sulfonated poly(ether ether ketone) (s-PEEK), sulfonated polyimides (s-PI), sulfonated poly(phenylene oxide) (s-PPO), sulfonated poly (arylene ether sulfone) (s-PES) or sulfonated poly(4-phenoxybenzoyl-1,4-phenylene) (s-PPBP).

In an exemplary embodiment of the disclosure, the content of the graphene sulfonate in the organic/inorganic hybrid composite proton exchange membrane is 0.005 wt %, and the content of the organic material is 99.995 wt %. In another exemplary embodiment of the disclosure, the content of the graphene sulfonate in the organic/inorganic hybrid composite proton exchange membrane is 0.05 wt %, and the content of the organic material is 99.95 wt %. In still another exemplary embodiment of the disclosure, the content of the graphene sulfonate in the organic/inorganic hybrid composite proton exchange membrane is 0.5 wt %, and the content of the organic material is 99.5 wt %. In an exemplary embodiment of the disclosure, the content of the graphene oxide in the organic/inorganic hybrid composite proton exchange membrane is 1 wt %, and the content of the organic material is 99 wt %. In another exemplary embodiment of the disclosure, the content of the graphene oxide in the organic/inorganic hybrid composite proton exchange membrane is 2 wt %, and the content of the organic material is 98 wt %. In still another exemplary embodiment of the disclosure, the content of the graphene oxide in the organic/inorganic hybrid composite proton exchange membrane is 5 wt %, and the content of the organic material is 95 wt %.

Several experimental examples are described below to prove the efficacy of the disclosure.

Methanol permeabilities of the proton exchange membranes of Example 1 to 3 are measured, and the proton exchange membranes of Example 1 to 3 include different graphene derivatives.

Example 1

Synthesis of Graphite Oxide

Graphite oxide was synthesized by oxidizing graphite with $KMnO_4$ and $NaNO_3$ in the presence of concentrated sulfuric acid. In detail, 10 g of graphite was dispersed in 250 ml of concentrated sulfuric acid, and then 5 g of $NaNO_3$ was slowly added into the dispersion solution. Thereafter, the resulted solution was cooled to about 0° C. in an ice bath, and 30 g of $KMnO_4$ was slowly added into the cooled solution within 5 hours. Then, the resulted solution was removed from the ice bath and kept at room temperature to react for 5 hours. After the reaction was completed, the solution was placed in the ice bath, and 5% $H_2O_2$ solution was added to eliminate the activity of $KMnO_4$. Then, the solution was filtrated to obtain graphite oxide, and the graphite oxide was washed to be neutral with hydrochloride acid solution and pure water. Thereafter, the obtained solid graphite oxide was disposed in vacuum to be dried.

Example 2

Exfoliated Graphite Oxide 100 mg of the graphite oxide was dispersed in 100 ml of pure water. The resulted solution was then vibrated by ultrasonic-wave vibration for several hours until the whole solution was clear, and thus graphene oxide (GO) dispersion solution was obtained.

Example 3

Graphene Sulfonate 1 g of dried powder of graphene oxide was added to 30 ml of fuming sulfuric acid, and the resulted solution was mixed thoroughly and kept at 50° C. to react for 3 days. After the reaction was completed, the solution was cooled, filtrated and washed with pure water until the powder was neutral. Before using, the powder was dispersed in the water by ultrasonic-wave vibration for 1 hour to obtain graphene sulfonate (GO—$SO_3H$) dispersion solution.

Example 4

Modification of Graphene Oxide with Alkyl Sulfonate 50 mg of graphene oxide was added into 0.06 M p-aminobenzene sulfonic acid solution, and the resulted solution was heated to 70° C. Then, 2 ml of $6\times10^{-3}$ M $NaNO_2$ solution was dropped slowly into the resulted solution while stirring, and the resulted solution was allowed to react at 70° C. for 12 hours. After the reaction was completed, the resulted solution was cooled, filtrated and washed with pure water until the powder was neutral, and thus graphite sulfonate (GO-Ph-$SO_3H$) dispersion solution was obtained.

Example 5

95 wt % (weighted in solid) of NAF (DE2020CS manufactured by DuPont) was dispersed in dimethyl acetamide (DMAc), and 5 wt % (weighted in solid) of graphene oxide was then dispersed in the resulted solution to form an ink. The ink was vibrated by ultrasonic-wave vibration, stirred and matured for 12 hours. Thereafter, the obtained ink was coated on a glass substrate and vaporized the solvent thereof to form a proton exchange membrane, which was then taken from the glass substrate.

Examples 6 and 7

The membranes were fabricated in a procedure similar to that of Example 5 except that the contents of graphene oxide were respectively 2 wt % and 1 wt %.

Examples 8 to 10

The membranes were fabricated in a procedure similar to that of Example 5 except that the added inorganic materials were graphene benzenesulfonate and the contents of graphene benzenesulfonate were respectively 0.5 wt %, 0.05 wt % and 0.005 wt %.

Examples 11 and 12

The membranes were fabricated in a procedure similar to that of Example 5 except that NAF (DE2020CS manufactured by DuPont) was replaced with sulfonated poly(ether ether ketone), and the added inorganic materials were graphene benzenesulfonate and the contents of the graphene benzenesulfonate were 0.05 wt %.

Method of Measuring the Methanol Permeabilities

The method of measuring the methanol permeabilities included the following steps. First, the proton exchange membrane was sandwiched at the joint sealing by which two tubular glass tanks were connected to each other. The tubular glass tanks were disposed symmetrically, wherein one of the tubular glass tanks was filled with pure water, and another was filled with methanol solution. Then, at a constant temperature of 25° C., methanol was crossover the proton exchange membrane from methanol solution containing tank to pure water containing tank, and thus concentration of methanol in the methanol solution containing tank was changed over time. Therefore, the methanol permeability of the proton exchange membrane was calculated by taking the concentration change of methanol into the following equation.

$$P=[C_B(t)TV_B]/[(t-t_0)AC_A].$$

In above equation, P is the methanol permeability, $C_A$ and $C_B$ are respectively referred to the concentration of methanol in the methanol solution containing tank and pure water containing tank, T is the thickness of the proton exchange membrane, and A is the testing area of the proton exchange membrane.

TABLE 1

| Material of proton exchange membrane | Methanol permeability ($10^{-7}$ $cm^2 s^{-1}$) |
|---|---|
| Nafion ® NRE-117 | 13.2 |
| Nafion + 0.005% GO—Ph—SO$_3$H | 1.67 |
| Nafion + 0.05% GO—Ph—SO$_3$H | 0.88 |
| Nafion + 0.5% GO—Ph—SO$_3$H | 0.92 |
| Nafion + 1.0% GO | 1.36 |
| Nafion + 2.0% GO | 2.14 |
| Nafion + 5.0% GO | 4.34 |

As shown in Table 1, through Examples 5 to 10, it is summarized that the proton exchange membranes having graphene oxide or graphene benzenesulfonate mixed therein are capable of preventing the issue of methanol crossover efficiently. Particularly, the desired effect can be obtained even if graphene oxide or graphene benzenesulfonate is added in a small amount such as lager than about 0.01%.

FIG. 1 shows the experimental data of the methanol permeabiliess of the composite proton exchange membranes having various amounts of added inorganic materials. According to FIG. 1, when a suitable amount of the inorganic material is added into the proton exchange membrane, the said proton exchange membrane with a less thickness has a methanol permeabilities which almost equals to that of NRE-117.

Table 2 shows swelling ratios of the proton exchange membranes of Examples 5 to 10 disposed in different concentrations of the methanol solution, wherein the proton exchange membranes have graphene oxide and the derivative thereof mixed therein or not. This experiment includes the following steps. Different composite proton exchange membranes were respectively cut into 5 cm$^2$ pieces, and then the pieces were soaked in the methanol solution of different concentration at 40° C. for 1 hour. The pieces were taken from the methanol solution and the area thereof was measured to obtain the swelling percentages of area.

The experimental results are shown in Table 2 below.

As shown in Table 2, when the proton exchange membranes of Examples 5 to 10 have graphene oxide or the derivative thereof mixed therein, the swelling ratios of the proton exchange membranes are greatly decreased, either disposed in the methanol solutions of a lower concentration (20 vol %) or a higher concentration (50 vol %). Thus, the deformation of the electrode structure is reduced.

Table 3 shows water uptakes and methanol uptakes of the proton exchange membranes, wherein the proton exchange membranes have graphene oxide mixed therein or not. These experiments have the following steps. First, different proton exchange membranes were disposed in methanol solutions of different concentration at 40° C. After balancing for 1 hour, the proton exchange membranes were taken from the methanol solution and the wet weights thereof were measured. Then, the proton exchange membranes were dried completely and the dried weights thereof were measured. Therefore, the solution amount absorbed by the proton exchange membrane was calculated by subtracting the dried weight from the wet weight, and therefore the solution uptake was obtained.

TABLE 3

| Membrane | Water uptake | Methanol uptake (20 vol % MeOH) | Methanol uptake (50 vol % MeOH) |
|---|---|---|---|
| Nafion | 30.1% | 36.0% | 57.8% |
| 0.005% GO—Ph—SO$_3$H | 26.4% | 32.8% | 49.6% |
| 0.05% GO—Ph—SO$_3$H | 25.1% | 29.1% | 45.1% |
| 0.5% GO—Ph—SO$_3$H | 24.2% | 27.1% | 31.2% |
| 1% GO—Ph—SO$_3$H | 24.7% | 28.0% | 42.2% |
| 2% GO | 28.1% | 28.9% | 43.55% |
| 5% GO | 26.4% | 27.8% | 40.0% |

As shown in Table 3, the proton exchange membranes having graphene oxide or the derivative thereof mixed therein maintain lower water uptakes, which is supported by the experimental results that similar proton exchange membranes have the lower swelling ratio of area.

Table 4 shows the conductivity changes of the composite proton exchange membranes having graphene oxide or the derivative thereof mixed therein. As shown in Table 4, except that the proton conductivity of the composite proton exchange membrane is greatly reduced when the graphene oxide is added as much as 5 wt %, the proton conductivities of the composite proton exchange membranes having a small amount of graphene oxide or the derivative thereof are similar.

TABLE 2

| Membrane | Original area (mm × mm) | 20 vol % MeOH, 40° C., 1 hour (mm × mm) | Swelling ratio in area (%) | 50 vol % MeOH, 40° C., 1 hour (mm × mm) | Swelling ratio in area (%) |
|---|---|---|---|---|---|
| Nafion ® | 50 × 50 | 56 × 56 | 25.4% | 70 × 70 | 96% |
| 0.005% GO—Ph—SO$_3$H | 50 × 50 | 55 × 55 | 21.0% | 67 × 67 | 79.6% |
| 0.05% GO—Ph—SO$_3$H | 50 × 50 | 55 × 55 | 21.0% | 66 × 66 | 74.2% |
| 0.5% GO—Ph—SO$_3$H | 50 × 50 | 54 × 53 | 14.5% | 57 × 58 | 32.2% |
| 1% GO—Ph—SO$_3$H | 50 × 50 | 54 × 54 | 16.6% | 58 × 58 | 34.6% |
| 2% GO | 50 × 50 | 54 × 55 | 18.8% | 61 × 61 | 48.8% |
| 5% GO | 50 × 50 | 54 × 54 | 16.6% | 61 × 61 | 48.8% |

TABLE 4

| | Membrane | | | | | |
|---|---|---|---|---|---|---|
| | 0.005% GO—Ph—SO$_3$H | 0.05% GO—Ph—SO$_3$H | 0.5% GO—Ph—SO$_3$H | 1% GO | 2% GO | 5% GO |
| Conductivity (S/cm) | 0.021 (15 um) | 0.023 (35 um) | 0.02 (25 um) | 0.0243 (30 um) | 0.0207 (25 um) | 0.006 (15 um) |

As shown in Table 4, when the proton exchange membranes have graphene oxide and the derivative thereof mixed therein, the proton exchange membranes can still maintain conductivities at a desired level even if the inorganic material is added in a small amount such as less than 2 wt %.

TABLE 5

| Material of proton exchange membrane | Methanol permeabilities ($10^{-8}$ cm$^2$ s$^{-1}$) |
|---|---|
| s-PEEK | 1.0 |
| s-PEEK + 0.05% GO—Ph—SO$_3$H | 0.5 |

As shown in Table 5, it is summarized that the proton exchange membrane having graphene sulfonate or graphene benzenesulfonate mixed therein can prevent the issue of methanol crossover efficiently. Particularly, the desired effect is obtained even if benzenegraphene sulfonate is added in a small amount such as about 0.05 wt %.

From the experimental results, it is proven that the composite proton exchange membranes of the embodiments of the disclosure have significant improvements on decrease in methanol crossover and swelling.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An organic/inorganic hybrid composite proton exchange membrane, comprising:
   an inorganic material of 0.001-10 wt %, wherein the inorganic material is a graphene derivative with two-dimensional structure; and
   an organic material of 99.999-90 wt %, wherein the organic material comprises a polymer material with sulfonic acid group.

2. The organic/inorganic hybrid composite proton exchange membrane as claimed in claim 1, wherein the graphene derivative is selected from a group consisting of graphene oxide, graphene sulfide, graphene hydroxide, graphene carbonate, graphene nitride and graphene sulfonate.

3. The organic/inorganic hybrid composite proton exchange membrane as claimed in claim 1, wherein the organic material comprises PTFE-PFSA copolymer or sulfonated hydrocarbon polymer.

4. The organic/inorganic hybrid composite proton exchange membrane as claimed in claim 3, wherein the sulfonated hydrocarbon polymer comprises s-PEEK, s-PPO, s-PI, s-PES or s-PPBP.

5. The organic/inorganic hybrid composite proton exchange membrane as claimed in claim 1, wherein the amount of the graphene derivative is 0.001-5 wt %.

6. The organic/inorganic hybrid composite proton exchange membrane as claimed in claim 1, wherein the graphene derivative is selected from a group consisting of graphene oxide, graphene sulfide, and graphene sulfonate.

* * * * *